United States Patent [19]

Bisbing

[11] Patent Number: 4,744,126

[45] Date of Patent: May 17, 1988

[54] COMBINED PULL AND CARRY HANDLE

[75] Inventor: Robert H. Bisbing, Springfield, Pa.

[73] Assignee: Southco, Inc., Concordville, Pa.

[21] Appl. No.: 925,743

[22] Filed: Oct. 30, 1986

[51] Int. Cl.$^4$ ............................................... B25G 1/00
[52] U.S. Cl. ................................. 16/124; 16/DIG. 19; 16/DIG. 25
[58] Field of Search ................. 16/124, 110 R, 111 R, 16/DIG. 19, DIG. 18, DIG. 24, DIG. 25; 49/460, 462; 74/543; 312/244; D8/DIG. 1

[56] References Cited

U.S. PATENT DOCUMENTS 1,976,118 10/1934 Cruikshank ........................... 16/124
4,090,756 5/1978 Frey et al. .............................. 16/124

FOREIGN PATENT DOCUMENTS 1049459 11/1966 Canada ................................... 16/124

Primary Examiner—Nicholas P. Godici
Assistant Examiner—Gerard M. Reid
Attorney, Agent, or Firm—Paul & Paul

[57] ABSTRACT

A combined pull and carry handle comprises a one-piece part adapted to be retained within an aperture in a panel or the like having a face portion adapted to engage the front of the panel when the one-piece part is retained within the aperture, an opening extending through the one-piece part, a cross-bar disposed across the top of the opening having a channel therein adapted to receive an edge of the panel when the one-piece part is retained within the aperture, a cap adapted to receive the one-piece part therein and sized so as to engage the back of the panel, and a pair of screws for securing the cap to the one-piece part and thereby retaining the one-piece part within the aperture in the panel.

11 Claims, 1 Drawing Sheet

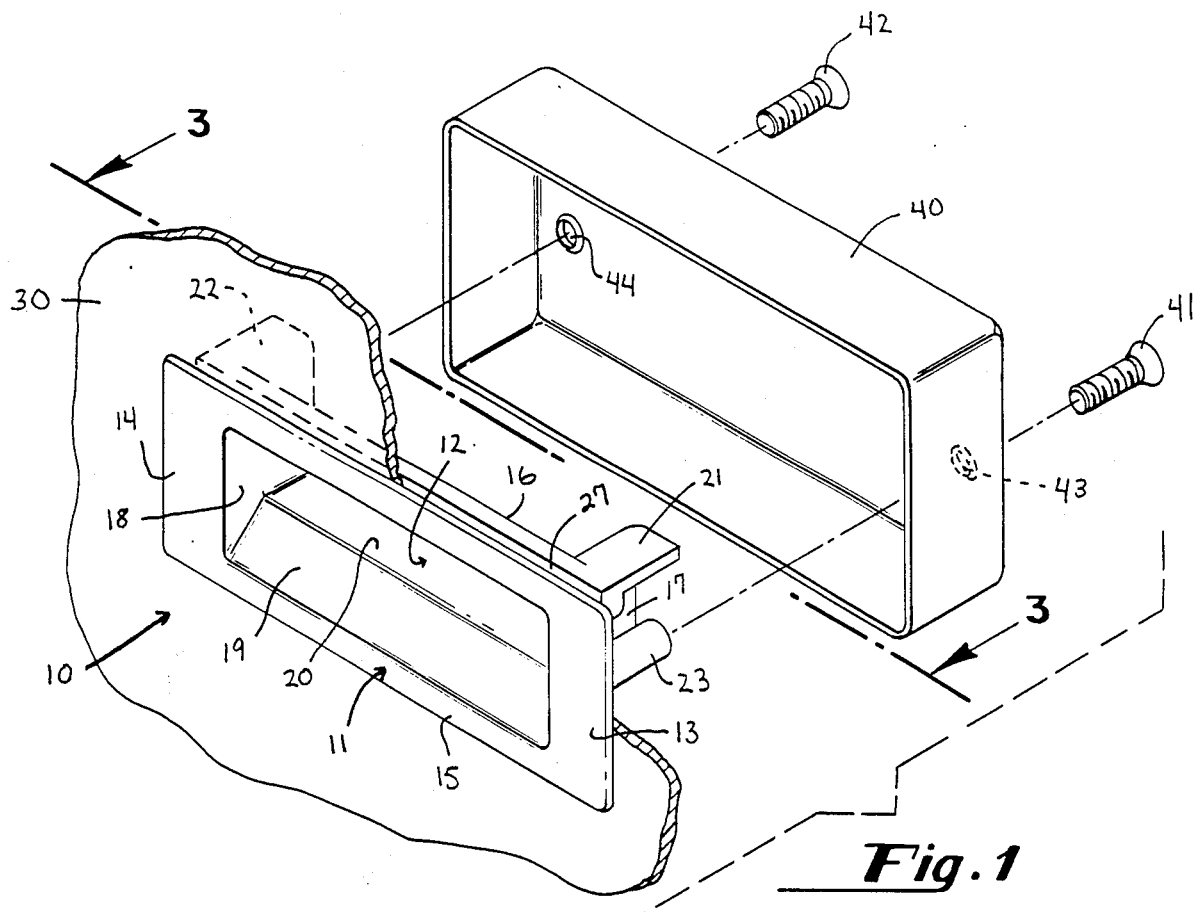
Fig. 1
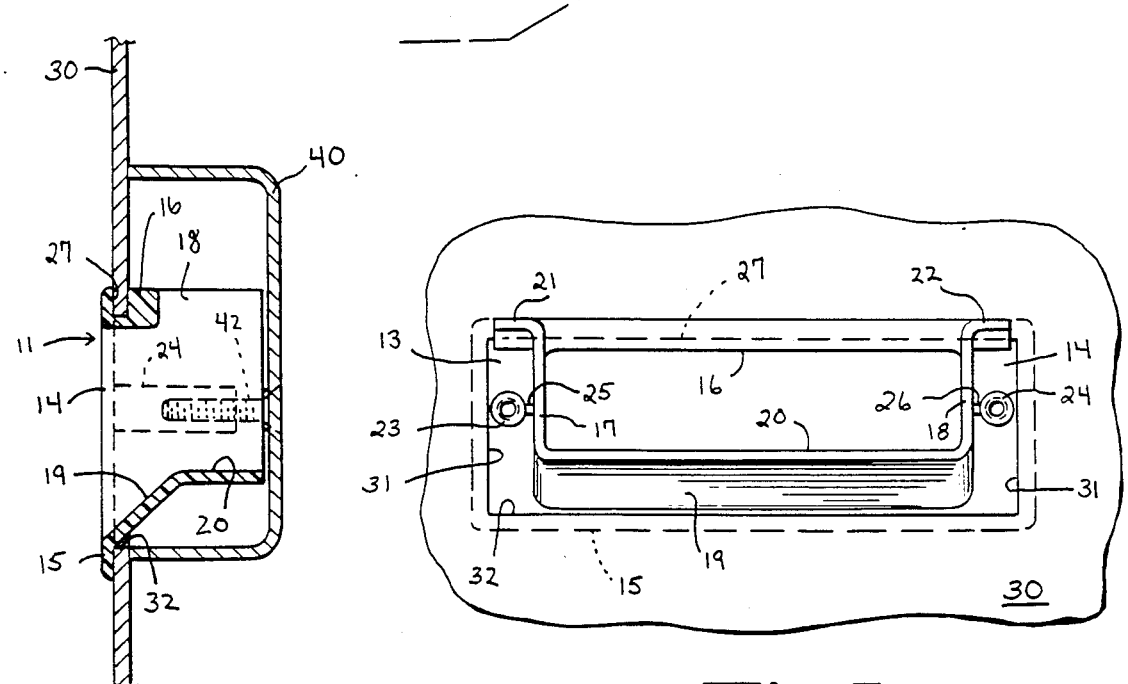
Fig. 2
Fig. 3

COMBINED PULL AND CARRY HANDLE

BACKGROUND OF THE INVENTION

This invention relates to carry handles in general and more specifically relates to flush mounted carry handles that can also be used as pulls.

Carry handles and pulls, as such, have been known for many years. A typical example of a carry handle is the familiar U-shaped metal bar which is fastened to an object by screws or the like whereby a space is created between the bar and the object to accommodate the fingers when the object is being lifted. Such handles could also be used as pulls if they are affixed to a movable portion of the object, such as a drawer or the like.

These U-shaped handles, by their nature, protruded away from the object and often interfered with transporting the object, particularly through narrow openings such as doorways, etc. Furthermore, because these handles were secured to the object at an angle normal to the lifting force, the carrying capacity of the handles was limited to the sheer strength of the fasteners or the bending strength of the panel to which they were fastened.

Flush mounted pulls are also generally known and typically comprise a one-piece molded plastic cup which has a slightly inwardly sloping back wall which provides a space to accommodate the fingertips. Due to limitations in the manufacturing process, however, it was impossible to design such a pull whereby the fingers could have sufficient grip to lift the object by the pull.

Another type of known flush mounted pull is little more than an aperture in the drawer face which is surrounded by a decorative plastic or metal frame on the drawer face. Although these pulls functioned quite well as pulls, they provided little protection for the fingers in the event that the pull was attempted to be used as a handle for lifting or carrying the object.

SUMMARY OF THE INVENTION

I have invented a flush mounted combination carry handle and pull which overcomes many of the above-mentioned disadvantages and which is simple in design, easy and inexpensive to manufacture, and which has a wide variety of practical applications.

Briefly, the invention comprises a one-piece component, preferably of molded plastic construction, which is adapted to be received in an aperture in a panel or the like, having a cross-bar on the top thereof which is provided with a groove adapted to receive an edge of the panel when the one-piece part is inserted in the aperture, and means for retaining the one-piece part in the aperture. The one-piece part is of substantially open-box configuration and is provided with bottom and side flanges which facilitate the flush mounting of the one-piece part with the panel. The retention means may be of any suitable type, and is disposed on the inner side of the panel. The preferred retention means is a rectangular cup, preferably of metal, which engages the inner side of the panel and is secured to the one-piece part by screws or the like. The cup is of such size and shape so as to provide a space behind the panel which will accommodate the fingers when they are wrapped around the cross-bar to lift the panel.

Accordingly, it is an object of the present invention to provide a combination pull and carry handle.

It is another object of the invention to provide a combination pull and carry handle which can be flush mounted to a panel.

It is a further object of the invention to provide a combination pull and carry handle having a one-piece part adapted to be received within an aperture in a panel having a top cross-bar which is adapted to engage an edge of the panel when the one-piece part is inserted in the aperture, and means for retaining the one-piece part in the aperture.

It is a further object of the invention to accomplish the above object by providing a cup adapted to engage the inner side of the panel and secured to the one-piece part to retain the one-piece part in flush mounted relation to the panel.

These and other objects of the invention will become apparent upon a reading of the following detailed description of the invention with reference to the drawings and the appended claims.

BRIEF DESCRIPTION OF THE DRAWINGS

FIG. 1 is an exploded perspective view of a preferred embodiment of the invention.

FIG. 2 is a sectional view of the preferred embodiment of FIG. 1, illustrated in mounted relation to a panel.

FIG. 3 is an elevational view, partly sectioned, of the interior side of the one-piece part of the invention as seen along line 3—3 of FIG. 1.

DETAILED DESCRIPTION OF THE EMBODIMENTS

As seen in the Figures, the one-piece part 10 is preferably of open box configuration and comprises a face 11 having an opening 12 therein which is defined by side flanges 13,14, bottom lip 15 and upper cross-bar 16. The inner edge of side flanges 13,14 extends rearwardly at substantially right angles thereto to form side walls 17,18, which define the depth of opening 12. A beveled wall 19 extends upwardly and rearwardly from bottom lip 15 and terminates in a rearwardly extending bottom wall 20.

In this configuration, as seen in FIG. 2, beveled wall 19 positions bottom wall 20 above the lower edge 32 of aperture 31 in panel 30, and thus facilitates the insertion of the one-piece part 10 into the aperture. Also, as seen in FIG. 2, the inside edge of the juncture between beveled wall 19 and bottom lip 15 is such that it receives the lower edge 32 of aperture 31 when the one-piece part 10 is placed within the aperture. Furthermore, the horizontal position of bottom wall 20 facilitates the gripping of the one-piece part 10 from below, whereby the invention can be utilized on a vertically sliding panel or the like.

As seen in FIGS. 1 and 3, the upper edges of side walls 17,18 are turned outwardly to form appendages 21,22, the upper surfaces of which are substantially flush with the upper surface of cross-bar 16. As seen in FIG. 3, the terminal edges of appendages 21,22 are also substantially flush with the side edges of cross-bar 16 and the distance between them substantially coincides with the width of panel aperture 31, thereby virtually eliminating any side-to-side play of the one-piece part within the panel aperture.

As also seen in FIGS. 1 and 3, the inner surface of side flanges 13,14 are provided with rearwardly extending cylindrical members 23,24 which, in the preferred embodiment, are adapted to receive a screw or like fastener to retain the one-piece part 10 within the panel aperture 31. Cylindrical members 23,24 are also supported by ribs 25,26 which are connected to the outside surfaces of side walls 17,18 as seen in FIG. 3. The distance between cylindrical members 23,24 also substantially coincides with the width of panel aperture 31 to prevent side-to-side play of one-piece part 10 when installed.

Upper cross-bar 16, as seen in the Figures, is provided with a longitudinal channel 27 in the upper surface thereof which is adapted to closely receive the edge of panel 30 therein when the one-piece part 10 is inserted within panel aperture 31. As best seen in FIG. 2, this construction of cross-bar 16 substantially surrounds the exposed edge of panel 30 and provides a protective, grippable surface for the fingers when the panel is to be lifted or pulled. As can be seen from the Figures, an upward force on cross-bar 16, such as would occur by lifting, would be transmitted to the panel 30. Thus, the carry capacity would be dependent upon the compressive strength of panel 30 and would be independent of the sheer and bending strengths typical of the known handles and pulls. In addition, because the side walls 17,18 and appendages 21,22 are in spaced relation, the upper face of the one-piece part 10 is substantially open as seen in FIG. 1, whereby the fingers can essentially be "wrapped-around" panel 30 when they are placed within opening 12 in face 11 of one-piece part 10, and a firm grip on cross-bar 16 and panel 30 can be achieved.

With reference to FIGS. 1 and 2, in the preferred embodiment of the invention, the one-piece part 10 is retained in the panel aperture 31 by a cap 40, preferably of stamped metal construction, and screws 41,42. As seen in the Figures, cap 40 is of substantially the same shape as one-piece part 10 and is sized so as to engage the inner surface of panel 30 when assembled and to provide a suitable space in the vertical direction above cross-bar 16 so as not to interfere with the fingers of the person lifting the panel.

Cap 40 is also provided with suitable apertures 43,44 through which screws 41,42 are disposed to mount cap 40 to one-piece part 10 and panel 30 whereby one-piece part 10 is retained within panel aperture 31. Screw apertures 43,44 are preferable positioned below the horizontal center of cap 40 to create the finger space behind panel 30 as mentioned previously, and are also positioned to correspond with cylindrical members 23,24 on the one-piece part to facilitate the proper positioning of screws 41,42.

Once cap 40 is mounted to panel 30 and one-piece part 10 as seen in FIG. 2, the interior of panel 30 is substantially sealed off from light, moisture and other environmental factors. In addition, the depth of cap 40, in the embodiment of FIG. 2, is such that, when assembled, cap 40 and one-piece part 10 give the appearance of being a continuous piece, particularly when both the cap 40 and the one-piece part are provided with the same or a similar finish.

Although an enclosed cap, such as cup shaped cap 40, is preferred, it is to be understood that other suitable means may be employed to retain one-piece part 10 within panel aperture 31. For example, bracket members, such as U-shaped brackets, spring clips, etc. may also be employed to retain the one-piece part within the panel aperture.

Preferred embodiments of the invention have been illustrated and described herein for purposes of understanding the invention and are not intended to be limitations thereof, and the various modifications or alternatives which may suggest themselves to those skilled in the art upon a reading of the foregoing specification are intended to be within the spirit and scope of the present invention as defined by the appended claims.

What is claimed is:

1. A combined pull and carry handle comprising:
   (a) a one-piece rectangular part of molded plastic construction having a face portion, a pair of side walls in spaced-apart relation rearwardly extending from said face portion at substantially right angles to the plane of said face portion, a beveled wall extending upwardly and rearwardly from said face portion and terminating in a rearwardly extending bottom wall, said bottom wall being connected to said side walls and forming substantially right angles therewith, wherein the plane of said bottom wall is substantially perpendicular to the plane of said face portion, an upper surface comprising a cross-bar disposed adjacent to said face portion having a channel therein disposed in parallel spaced relation to said face portion, said side walls having outwardly turned appendages at the upper edge thereof, said appendages being disposed coplanar with the upper surface of said face portion and said cross-bar, a pair of cylindrical member rearwardly extending from a rear surface of said face portion and substantially parallel to said side walls, a bore in each of said cylindrical members, wherein said one-piece part has a opening therethrough defined by said cross-bar, said side walls, said bottom wall and said beveled wall; and
   (b) a rectangular metal cap having a pair of holes therein corresponding in location to said cylindrical members of said one-piece part, said cap being larger than said one-piece part in the vertical direction, and being secured to said one-piece part by a pair of screws disposed through said holes in said cap and in threaded engagement with the bore of said cylindrical members of said one-piece part.

2. The pull and carry handle of claim 1, wherein said one-piece part is disposed within an aperture in a panel, said face portion being disposed on an outside surface of said panel, and wherein said metal cap is disposed against an inside surface of said panel whereby said cap and said one-piece part are in sandwich relation to said panel.

3. A combined pull and carry handle comprising:
   (a) a one-piece part adapted to be inserted within an aperture in a panel and the like, said one-piece part having an opening therein in a face thereof, said face lying substantially in one plane; said opening being defined by a cross-bar at an upper edge of said one-piece part, a pair of spaced-apart side walls rearwardly extending from said face of said one-piece part, a bottom wall disposed substantially perpendicular to said side walls, substantially parallel to said cross-bar and substantially perpendicular to said plane which said face lies in and a beveled wall connecting said bottom wall to said face; said cross-bar having a channel therein adapted to receive an edge of a panel in close fit relation when said one-piece part is inserted within an aperture in a panel; said cross-bar extending rearwardly to a lesser extent than said side walls and bottom wall; wherein said opening is free of obstructions rearwardly of said cross-bar, whereby the fingers of a user can be inserted within said opening in wrapped-engagement with said cross-bar; and (b) a cup shaped adapted to be affixed to said one-piece part to comprise means for retaining said one-piece part in clamped-engaged with a panel when said one-piece part is inserted within an aperture in a panel; said cap further comprising means for creating a space upwardly and rearwardly of said cross-bar of said one-piece part to facilitate the insertion of the fingers of a user in wrapped-engagement with said cross-bar wherein said cap has a vertical height dimension greater than a vertical height dimension of said one-piece part, whereby said cap is adapted to contact a panel at a location vertically remote from the connection of said cross-bar with a panel when said one-piece part and said cap are affixed to a panel.

4. The pull and carry handle of claim 3, wherein said cap, when affixed to said one-piece part, comprises a back wall for said opening in said one-piece part.

5. The pull and carry handle of claim 3, wherein said cap is metal.

6. The pull and carry handle of claim 3, wherein said one-piece part is of molded plastic construction.

7. The pull and carry handle of claim 3, wherein said one-piece part is adapted for being flush mounted with the panel when disposed within the aperture.

8. A combined pull and carry handle comprising:

(a) a one-piece part affixed within an aperture in a panel, said one-piece part having an opening therein in a face thereof said face lying substantially in one plane; said opening being defined by a cross-bar at an upper edge of said one-piece part, a pair of spaced-apart side walls rearwardly extending from said face of said one-piece-part, a bottom wall disposed substantially perpendicular to said side walls, substantially parallel to said cross-bar and substantially perpendicular to said plane said face lies in, and a beveled wall connecting said bottom wall to said face; said cross-bar having a channel therein into which an edge of said panel aperture is disposed in close-fit relation; said cross-bar extending rearwardly to a lesser extent than said side walls and bottom wall; wherein said opening is free from obstructions rearwardly of said cross-bar, whereby the fingers of a user can be inserted within said opening in wrapped-engagement with said cross-bar so as to contact an inside surface of said panel; and (b) a cup shaped cap affixed to said one-piece part to comprise means for retaining said one-piece part in clamped-engagement with said panel; said cap further comprising means for creating a space upwardly and rearwardly of said cross-bar of said one-piece part to facilitate the insertion of the fingers of a user in wrapped-engagement with said cross-bar wherein said cap has a vertical height dimension greater than a vertical height dimension of said one-piece part, whereby said cap is adapted to contact said panel at a location vertically remote from the connection of said panel with said cross-bar 9. The pull and carry handle of claim 8, wherein said cap, when affixed to said one-piece part, comprises a back wall for said opening in said one-piece part.

10. The pull and carry handles of claim 8, wherein said cap is metal.

11. The pull and carry handle of claim 8, wherein said one-piece part is of molded plastic construction.

* * * * *

UNITED STATES PATENT OFFICE
CERTIFICATE OF CORRECTION

Patent No. 4,744,126  Dated  May 17, 1988

Inventor(s) Robert H. Bisbing

It is certified that error appears in the above-identified patent and that said Letters Patent are hereby corrected as shown below:

Column 5, line 6, "clamped-engaged" should be "clamped-engagement".

Signed and Sealed this

Eighteenth Day of October, 1988

Attest:

DONALD J. QUIGG

*Attesting Officer*   *Commissioner of Patents and Trademarks*